(12) United States Patent
Rogowitz et al.

(10) Patent No.: US 8,203,529 B2
(45) Date of Patent: Jun. 19, 2012

(54) TACTILE INPUT/OUTPUT DEVICE AND SYSTEM TO REPRESENT AND MANIPULATE COMPUTER-GENERATED SURFACES

(75) Inventors: Bernice E. Rogowitz, Ossinig, NY (US); Paul Borrel, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 12/047,771

(22) Filed: Mar. 13, 2008

(65) Prior Publication Data

US 2009/0231287 A1    Sep. 17, 2009

(51) Int. Cl.
*G09G 5/00* (2006.01)
*H04B 3/36* (2006.01)
*G08B 6/00* (2006.01)
*G06F 3/01* (2006.01)

(52) U.S. Cl. ............. 345/156; 340/407.1; 340/407.2; 715/702

(58) Field of Classification Search ............. 345/156, 345/173–178, 419–427; 715/702; 434/113; 340/407.1–407.2
See application file for complete search history.

(56) References Cited

U.S. PATENT DOCUMENTS

| | | | | |
|---|---|---|---|---|
| 6,310,604 B1 * | 10/2001 | Furusho et al. | ............. | 345/156 |
| 7,009,595 B2 | 3/2006 | Roberts et al. | | |
| 7,113,177 B2 | 9/2006 | Franzen | | |
| 7,245,292 B1 * | 7/2007 | Custy | ............. | 345/173 |
| 7,259,761 B2 | 8/2007 | Shih et al. | | |
| 7,308,314 B2 | 12/2007 | Havey et al. | | |
| 7,324,094 B2 | 1/2008 | Moilanen et al. | | |
| 7,336,266 B2 | 2/2008 | Hayward et al. | | |
| 7,339,574 B2 | 3/2008 | Kyung et al. | | |
| 2003/0057973 A1 | 3/2003 | Nojima et al. | | |
| 2003/0117371 A1 | 6/2003 | Roberts et al. | | |
| 2004/0046777 A1 | 3/2004 | Trenblay et al. | | |
| 2005/0231468 A1 * | 10/2005 | Chen et al. | ............. | 345/156 |
| 2006/0119578 A1 * | 6/2006 | Kesavadas et al. | ............. | 345/161 |
| 2008/0261165 A1 * | 10/2008 | Steingart et al. | ............. | 433/24 |
| 2010/0261526 A1 | 10/2010 | Anderson et al. | | |

FOREIGN PATENT DOCUMENTS

JP    2004101677 A  *  4/2004

OTHER PUBLICATIONS

Yang, et al., "Quantitative Tactile Display Device with Pin-Array Type Tactile Feedback and Thermal Feedback"; May 19, 2006.
Iwata, et al., "Project FEELEX: Adding Haptic Surface to Graphics"; Aug. 17, 2001.

(Continued)

*Primary Examiner* — Bipin Shalwala
*Assistant Examiner* — Ilana Spar
(74) *Attorney, Agent, or Firm* — Scully, Scott, Murphy & Presser, P.C.; Daniel P. Morris, Esq.

(57) ABSTRACT

The present invention discloses a tactile input/output device for representing and manipulating computer-generated surfaces. Also disclosed are a novel system and method for implementing the forgoing aspects. In essence, there is provided an intuitive concept of manipulating and editing a computer-generated surface, by employing a combination of traditional input and output devices (keyboard, mouse, display, etc.) and a novel device that enables users to touch, edit and modify a physical representation of the surface. The tactile device includes an array of displaceable pins, which are driven by a control system having a plurality of micro-actuators operating in combination with a rack-and-pinion assembly.

14 Claims, 6 Drawing Sheets

OTHER PUBLICATIONS

VRlab, "FEELEX", pp. 1-3; 2008.

Dan Overholt, "The MATRIX: A Novel Controller for Musical Expression"; and, 2001.

Wagner, et al., "A Tactile Shape Display Using RC Servomotors", Harvard BioRobotics, pp. 1-8, Mar. 24, 2002.

* cited by examiner

TACTILE INPUT/OUTPUT DEVICE AND SYSTEM TO REPRESENT AND MANIPULATE COMPUTER-GENERATED SURFACES

BACKGROUND OF THE INVENTION

1. Field of the Invention

The present invention relates to a tactile input/output device for representing and manipulating computer-generated surfaces. Moreover, the invention also pertains to a novel system and method for implementing the forgoing aspects.

2. Discussion of the Prior Art

The human brain is uniquely designed to be capable of viewing and manipulating 3-d visual objects. In presently known current visualization systems, three-dimensional data is normally represented on a computer display screen essentially depriving the user of the ability to directly manipulate the object. Moreover, conventional computer display systems only provide for a 2-dimensional representation of 3-dimensional objects, resulting only in the provision of an indirect interface between the shape of the object and the human user who is designing or operating on the surface. Accordingly, the present invention opens the door to a concept for visualizing and manipulating data directly through the use of a novel haptic (touch) device. The invention also provides an important tool for visually impaired users who cannot use current display technologies to be able to interact with 3-D data.

The formation of a 3-D visual design is often guided by constraints, whereby, for example, it is relatively easy to represent these constraints mathematically; however, it is difficult to reveal them to the user while they are engaged in the design process. Representing these constraints using a tactile interface permits the user to feel the constraints directly, in that the user is prevented from moving into protected regions, and can provide this information without cluttering up the scene with indirect visual indicators.

In currently employed systems, there is no possibility to have the "softness" or "hardness" of a shape to be communicated, in effect, a limitation that can be easily overcome by a system that communicates the material properties of the shape in a tactile manner. This can be applied in order to guide the designer of the shape based on the material, like a sculptor, or convey some attribute of the shape, facilitating that this could be a physical attribute, such as its strength, or a metaphysical attribute, such as the rigidness of a constraint.

There are various known solutions in the technology, which, however, are subject to drawbacks and limitations in contrast with the present invention. Thus, for instance, there are known passive devices that enable one to probe the shape of a surface but which do not allow the user to change it through the employed device. For example, there are devices based on the Phantom technology that permit the user to receive tactile feedback through an individual probe about points on a 3-D computer-based object. For visually impaired users, there are cardboard relief objects, or objects made through the user of layered manufacturing techniques that facilitate an appreciation of a large terrain, such as a relief map. Also, there are output devices that provide a small, static array of pins as the interface, but these are fixed to one spatial location and only offer output to the user, not input. However, these are not dynamic and are not editable in nature.

SUMMARY OF THE INVENTION

Accordingly, in order to obviate the limitations and disadvantages that are currently encountered in the state-of-the-art, the present invention is directed to the provision of unique devices, systems and methods of a tactile input/output nature for representing and manipulating computer-generated surfaces. These surfaces can represent 3-D surfaces of computer-generated objects, surfaces representing data values, such as a topographic map, or surfaces representing elevations of 2-D objects, such as street maps or architectural drawings.

In essence, the present invention provides an intuitive means of manipulating and editing a computer-generated surface, by employing a combination of traditional input and output devices (keyboard, mouse, display, etc.) and a novel device that enables users to touch and modify a physical representation of the surface. The tactile device comprises an array of displaceable pins which are driven by a control system having a plurality of micro-actuators operating in conjunction with a rack-and-pinion assembly. Changing the surface (i.e., representation) through the manipulation of the device offers a very intuitive and effective means of entering new or modified shapes, while the computer controls and maintains the overall representation of the new surface, including enforcing pre-established constraints. The invention, thus, extends prior-art concepts that provide the ability to combine sensory feedback with visual feedback by imparting an ability to manipulate the representation of surfaces. Moreover, the combination of the traditional input mechanisms (mouse motions, menus, etc.) with the manipulation of the physical device offers a set of rich and varied scenarios adapted to enhance the productivity of designers.

Accordingly, it is an object of the invention to provide a novel tactile input/output device and system for the presenting and manipulating computer-generated 3-D surfaces.

A further object of the present invention resides in providing a unique method for manipulating and editing a computer-generated surface utilizing a combination of this novel haptic device with traditional input/output devices.

BRIEF DESCRIPTION OF THE DRAWINGS

Reference may now be made to the following detailed description of preferred features of the invention, taken in conjunction with the accompanying drawings; in which.

DETAILED DESCRIPTION OF THE INVENTION

Currently in the technology, the traditional method for manipulating and editing computer-generated surfaces is to view a representation of the surface on a computer display and then to manipulate the parameters algorithmically, or through the use of a keyboard and mouse. The present invention provides a novel system that combines the traditional method with a haptic (touch) device, thereby imparting new, intuitive capabilities to human users.

Figure 1:
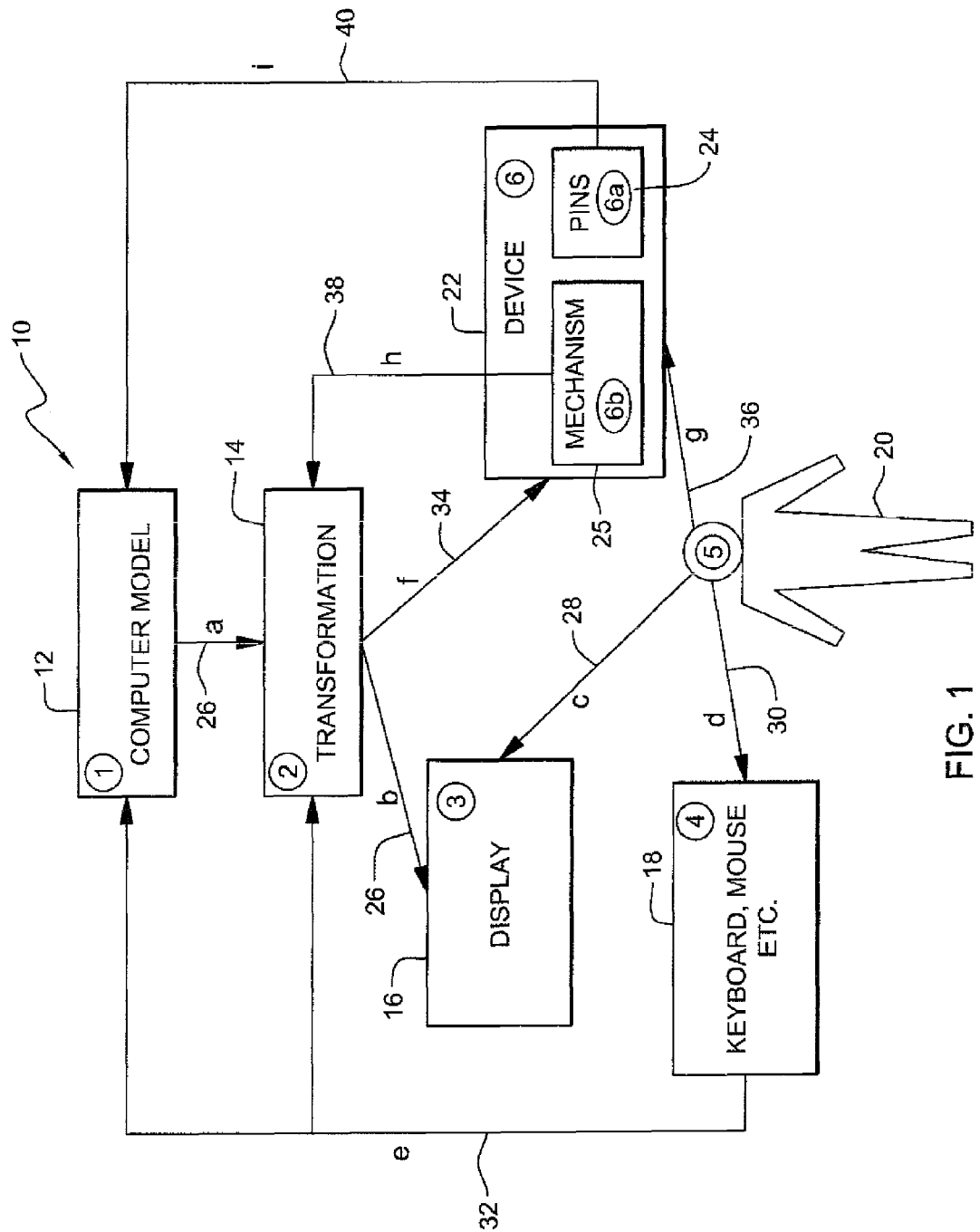
FIG. 1 illustrates an overall diagrammatic representation of the functionality of the inventive system.

FIG. 1 shows an overall schematic illustration of the inventive functionality of the system 10. The traditional system components are represented by Subsystems 1-5, and the relationships between these Subsystems, as functions a-e. The novel components of the system described in this disclosure are subsystem 6, and the novel relationships f-i. The invention consists of the new functionality introduced by this new subsystem and its functions, but also consists of new modes of interaction obtained through the concurrent use of the traditional and novel subsystems.

Subsystem 1: Computer model 12 can be any mathematical model, on a computer, representing a surface. This surface can reflect a real physical object, or can represent the values of a 2-D array (such as the sound spectrogram of a human voice, over time). The mathematical model is driven by parameters that affect the characteristics of the surface, such as scale, shape, constraints, and so forth.

Subsystem 2: Transformation 14 comprising any mathematical transformation that may be used to define (1) the viewing angle on the surface, and (2) the representation of the surface on the tactile device in Subsystem 6.

Subsystem 3: Visual Display 16 can be any visual display that represents the surface, as modeled by Subsystem 1 (Model 12), under the viewing angle of Subsystem 2, i.e., transformation 14.

Subsystem 4: Traditional Input Device 18 can be any keyboard, mouse, trackball or joystick device, or combination thereof.

Subsystem 5: The Human User 20, as schematically represented.

Subsystem 6: The Tactile Device 22 of the invention. The tactile device has two components, wherein one is an array of pins 24 whose positions can be changed by the computer 12 or by the human 20, and that represents the surface as modeled. The array of pins 24 is attached to a second component 6b, a five-degree of freedom mechanism 25 (articulated platform) that allows the human 20 to displace the array of pins within a plane and to orient the array in any orientation.

Relationship a: Computer model output 26. The computed three-dimensional model that feeds to the viewing angle transformation 14.

Relationship b: Output 26 to the Visual Display 16. The data sent to the visual display that defines the visual representation of the surface on the visual display.

Relationship c: Visual output 28. The perception of the visual display 16 by the human user 20.

Relationship d: User interaction 30 with traditional input devices. 18

Relationship e: User input 32 to the computer model 12 and viewing angle transformation 14. Output from the Subsystem 4, the traditional input device 18, is used by Subsystem 1 (Model 12) to modify the computer model 12 and/or by Subsystem 2 to modify the viewing angle transformation 14.

Relationship f: Output 34 to the Tactile Device 22. The data sent to the tactile device 22 that defines the position of the pins 24 to represent the surface and the viewing angle, computed by the mathematical models.

Relationship g: Human Input 36 to the Tactile Device 22. The action of the user 20 to change the pin positions of the tactile device 22 and/or the position and orientation of the entire tactile device in 3-D space.

Relationship h: Tactile Control 38 of the pins positions within the model. Changes in the position and orientation of entire tactile device 22 changes the transformation 14 in Subsystem 2.

Relationship i: Tactile Control 40 of the Computer model 12. Changes in the positions of the pins 24 in the Tactile Device 22 change the parameters of the computer model 16 in Subsystem 1.

Modes of Operation

The use of the tactile device 22 to edit, view and manipulate the computer model 12 of a surface is achieved in the following manner: the surface formed by the array of pin tops matches a surface within the computer model and the correspondence between these two surfaces (pins' 24 extremities and computer model 12) is maintained at all times. When a user 20 modifies the height of the pins 24, the computer surface changes accordingly and, conversely, the tip heights of the pins 24 change so as to mirror any change in the computer model 12.

A software controller (not shown) permits for manipulating the surface and the software artifacts that are necessary to use the device 22, and communicates with the device's control system to measure and/or modify the extension of the pins 24 and to measure the location of the pins on the articulated platform 25.

Figure 2:
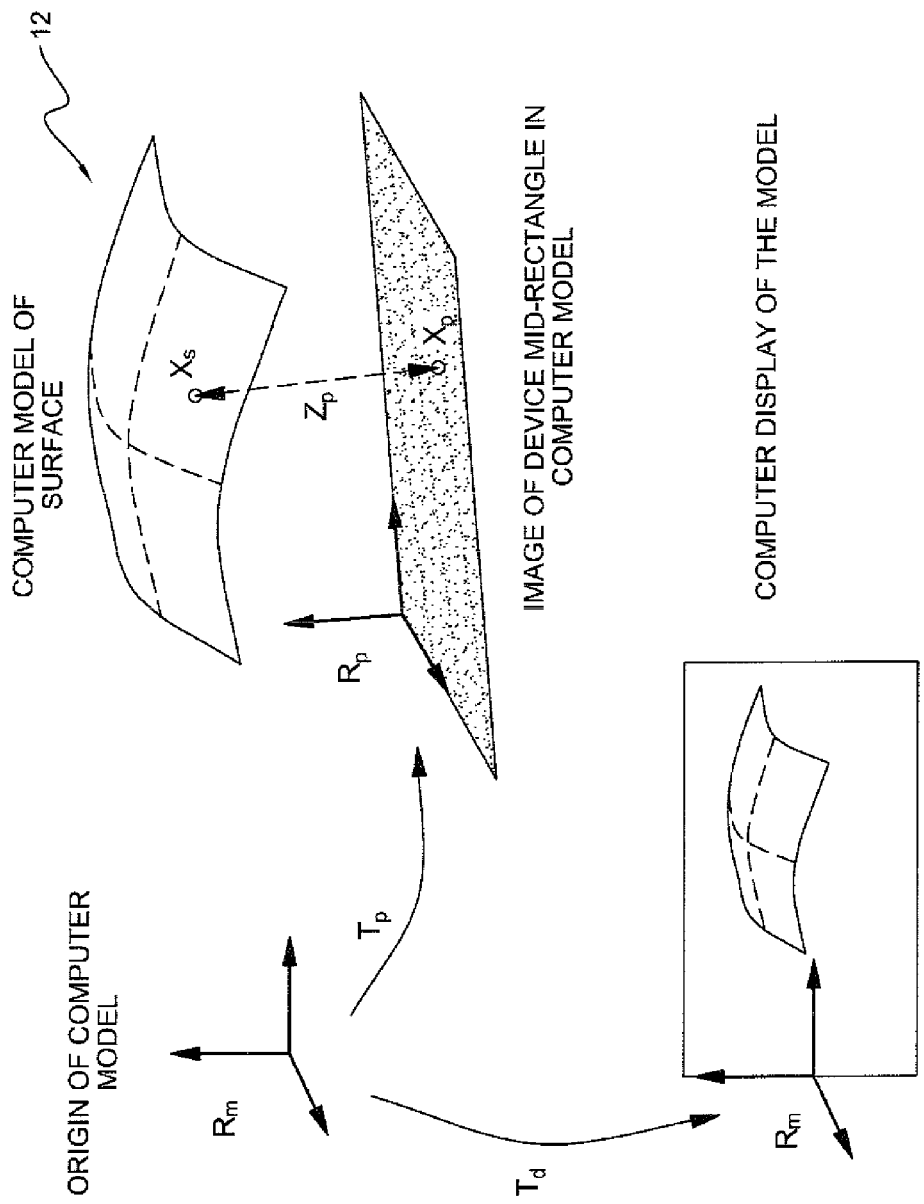
FIG. 2 illustrates aspects in the origin of a computer model, computer model surface and computer display of the model.

Referring to drawing FIG. 2, in order to achieve the correspondence between a surface and the device 22 one first identifies which surface, or more precisely, which subset of the surface in the computer model 12 corresponds to the surface defined by the array of pin tips. In one implementation of this idea, we define the device mid-rectangle as the rectangle defined by the pins' extremities when they are all positioned at the mid-point of their range of motion. Positioning and scaling the device mid-rectangle within the computer model achieve the correspondence between the device and the computer model. The computer model surface is registered with the pin tip surface. One method to achieve this is to define a coordinate system, $R_p$, positioned at a corner of the image of the mid-rectangle in the computer model in such a manner that the mid-rectangle lies within the {x,y} plane of $R_p$. Tp is called the transformation that defines the position and orientation of $R_p$, with respect to the reference coordinate system of the computer model, Rm. Tp, together with a scaling factor s, completely define the location of the image of the device mid-rectangle with the computer model 12.

Another transformation, Td, represents the way the surface is displayed on the computer display. Such transformation is well known to those skilled in computer graphics, and is not described in detail. The software controller provides the user with control over the transformation Td, so that any changes in the surface in the computer model can be viewed on the traditional visual display.

Figure 3:
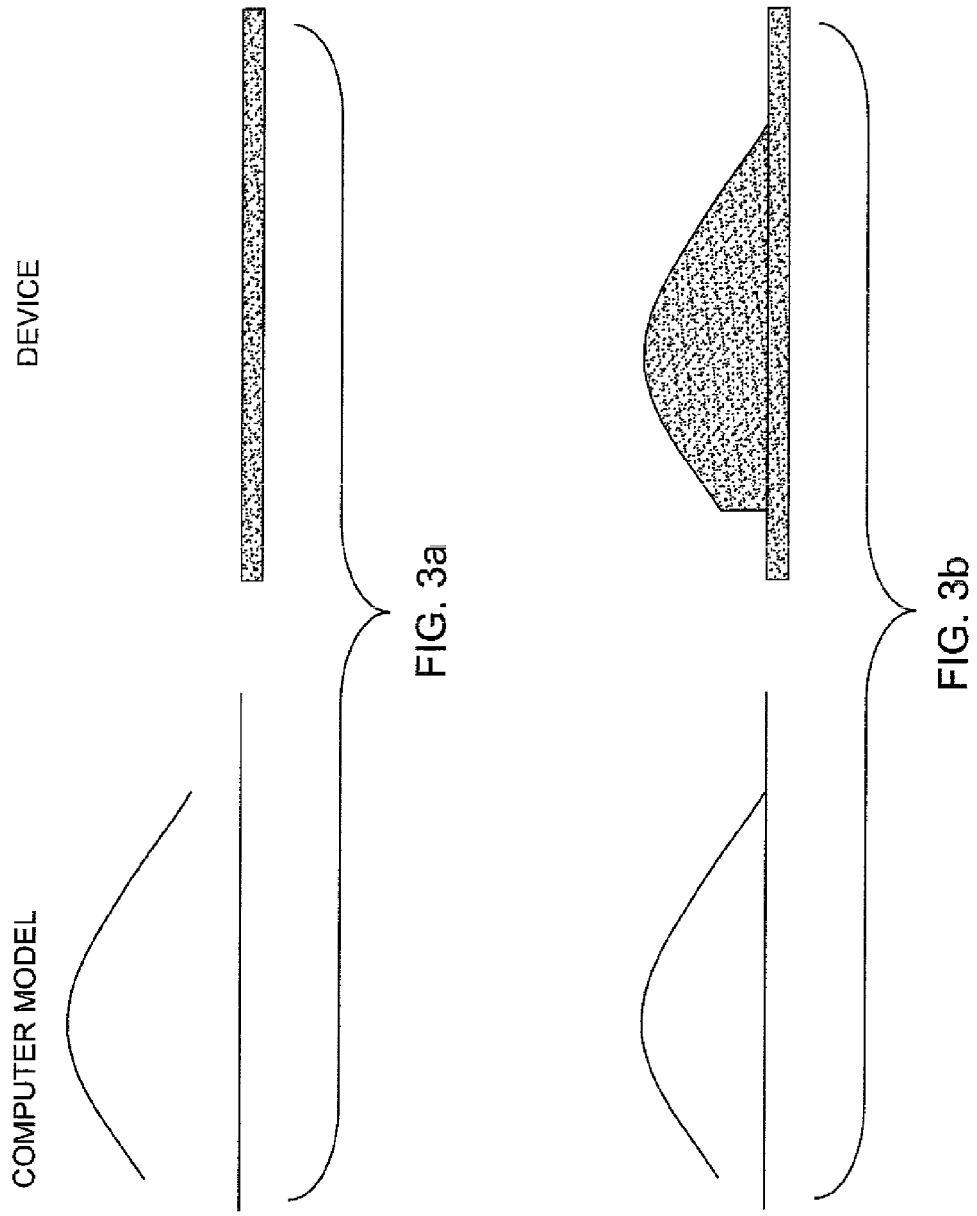
FIGS. 3a and 3b, respectively, illustrate computer models and devices for implementing the invention.

The following operational sequence is illustrated in drawing FIGS. 3a and 3b:

1. The user selects a surface or a patch of surface within the computer model using the interaction mechanisms provided for by the software controller.

2. The user or the computer system positions and scales a rectangle in space, as illustrated in FIG. 3a. This rectangle is the image of the device mid-rectangle.

3. The software controller automatically moves the rectangle parallel to itself (along its normal) until the distance between the plane of the rectangle and the closest surface point becomes equal to zero, as illustrated in FIG. 3b (left).

4. The software controller then calculates the displacement of each pin so that the tip thereof lies on the surface (refining hereinbelow to the details of this calculation).

If any of these displacements exceeds the range of motion of the pins of the device, the software controller warns the user and invalidates the current position of the mid-rectangle. The user can then choose another position or another scale for the device mid-rectangle.

If there are pins that have no corresponding point on the surface, their displacement is set to the minimum allowable value (as is the case in FIG. 3b).

If more than one point corresponds to a single pin, as would be the case, for example, with a warped surface, the closest point is chosen.

5. The software controller sends the appropriate signal to each pin control system to extend it by an amount equal to the displacement calculated in the previous step, as illustrated in FIG. 3b (right).

The displacement h(i,j) of each pin on the device is calculated as follows:

Each pin is identified by its indices i (1<i<I) and j (1<j<J) in both directions.

The image of each pin's extremity is a surface point identified by its coordinates Xs={xs, ys, zs} in the coordinate system $R_p$. These coordinates are fully determined by the actual size of the device, the scaling factor s, and the indices of i and j of the pin in the device.

With Di and Dj the size of the device in each dimension, one has: xs=s*i/I*Di and ys=s*j/J*Dj and h(i,j)=zp/s.

The correspondence between device and computer model, as described hereinabove, is maintained at all times—either by changing the computer model of the surface to match pin displacements—or by changing the heights of the pins to match changes on the computer model.

In addition to the foregoing, various scenarios may be implemented through the foregoing structure, as follows:

The above construction allows various actions to be performed by a user of the system. These actions can be categorized in the following manner:

Changing the computer model surface location. This change, performed through some user interface of the software controller, corresponds to imparting a new location Tp to the device (more precisely its mid-rectangle) within the computer model. This action may be accomplished, for example, in order to position the device on a portion of a surface that the user is intending to work on in subsequent interactions.

Similarly, the location can also be changed through modifications of the scaling factor s to adjust to the size of the surface, or the portion of surface that to be worked on. Changing the location of the rectangle changes the height of all the pins. This plane can be raised or tilted such that it causes a corresponding tilt or change in pin heights.

As the location of the mid-rectangle changes, the distance between the surface and the mid-rectangle changes, which in turns results in changes in the heights of the pins, as explained above.

Surface editing in the computer model, reflected on the array of pins. The user, using a computer application, may modify the surface using any of the techniques available through the Geometric Modeling literature. The height of the pins, as described above, mirrors these modifications, so that the user may touch and see these changes on the device.

A further significant application of this mode of surface editing is collaborative surface editing, where a plurality of users can have such haptic input/output device systems operating on the same computer-generated data. In this system, if one user modifies the computer model of the surface, other users, possibly remotely located and/or visually impaired, can "observe" the effect of the surface editing through their haptic device. That is, all users can collaboratively observe and edit the same computer data.

Because each user in a collaborative environment has his/her own device, each can view the computer-generated data from a different viewing angle, by manipulating the position of the platform holding the array of pin mechanism.

Surface editing with the pins, reflected on the computer model. The user can change the height of the pins to modify the surface. The user changes the position of the pins in the device, and that change is reflected in the computer model. Changes in the heights of the pins can be used to modify the parameters of the computer model surface using techniques such as have been specified, which determines surface deformation from the displacement of selected surface points (reference).

The displacement of a surface point is calculated as follows. Let U(i,j) be the vertical displacement of a pin (i,j). The new z coordinate of the surface point in the coordinate system $R_p$ is incremented by U(i,j)*s.

There are several variations of this mode of interaction:

Simple pushing action: User pushes on pins that deform downward to desired position.

Varying materials: Stiffness of the control loop (resistance) can be varied to provide different material sensations (e.g., clay vs. jello).

Modeling Constraints: Stiffness of the control loop (resistance) can be varied to represent constraints (e.g., parts of the surface that cannot be moved, or that can be moved only within certain limits).

Tactile inspection of stiffness by touching the pins and feeling the resistance to motion.

Correction: The user pushes on pins, which push back (upward) allowing interactive correction of previous input. This can be done in two ways: The user selects which pin position needs to be corrected. A tap on the selected pins changes the mode, and the pins move upward until the user's touch is released. All pins revert to full height, except for the pins that are being touched.

Change of the location of the device on its passive 5-degree of freedom articulated platform. The user can modify the position of the device on the platform within an allowable range. These modifications can be interpreted in two different modes of interactions, selected by the user, such as:

Tactile inspection of a surface. As the whole device is moved, the mid-rectangle location within the model is changed accordingly, with in turn results in changes in eight of the pins. Therefore, the user feels and sees the height of the pins changing as if the device were "swept" on the surface model.

Viewing of a surface. As the whole device is moved, the motion is interpreted as a change in the viewing angle on the surface. In this case, no changes are applied to the heights of the pins, as the user simply changes the way he/she is looking at the surface defined by the tips of the pins. In order to maintain a consistent relationship between the view of the surface on the device and on the computer display, the change of position and orientation of the device on the platform is measured and applied to the viewing transformation Td.

Figure 4:
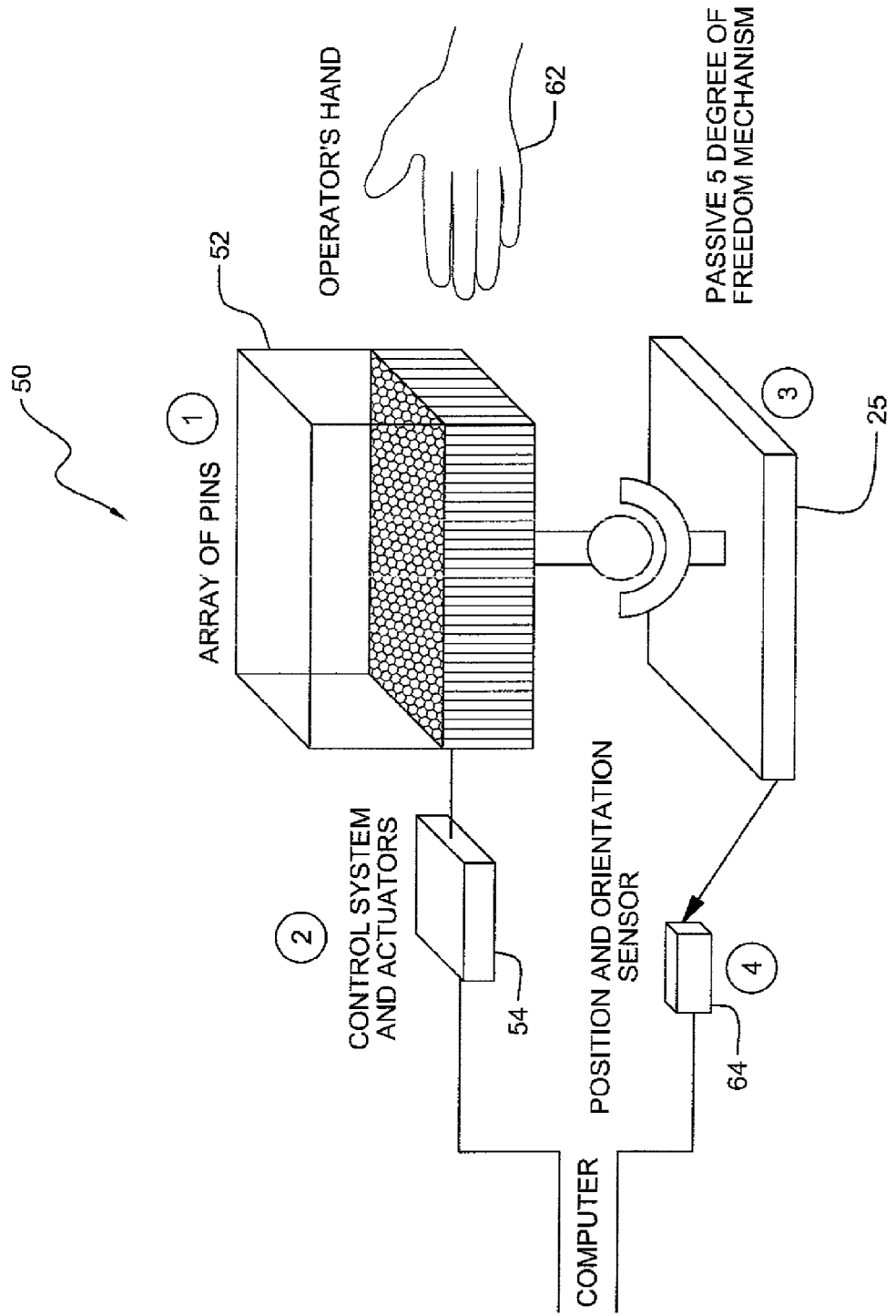
FIG. 4 illustrates, generally diagrammatically, a physical representation of an inventive device for implementing the representation and manipulation of computer-generated 3-D surfaces.

In addition to the foregoing, a physical implementation of a device 50 for carrying out the inventive concept is disclosed in FIG. 4 of the drawings, representing the following structure:

The device, as described, is comprised of the following four components:

1. A 2-d array of vertically displaceable pins 52. The pins can have broad, rounded tips in order to provide a safe and physically smooth surface. The resolution of the tactile array, i.e., the distance between neighboring pins, is fine enough to provide the impression of a continuous surface, as dictated by the data. At minimum this would be 100 pins per square inch, but could be finer, depending on the requirements of the application. There are several examples in the literature of such arrays of pins; it will therefore be considered as a commonly available component.

2. A control system with an array of actuators 54 that can measure and drive the height of the pins 52, as illustrated below.

Figure 5A:
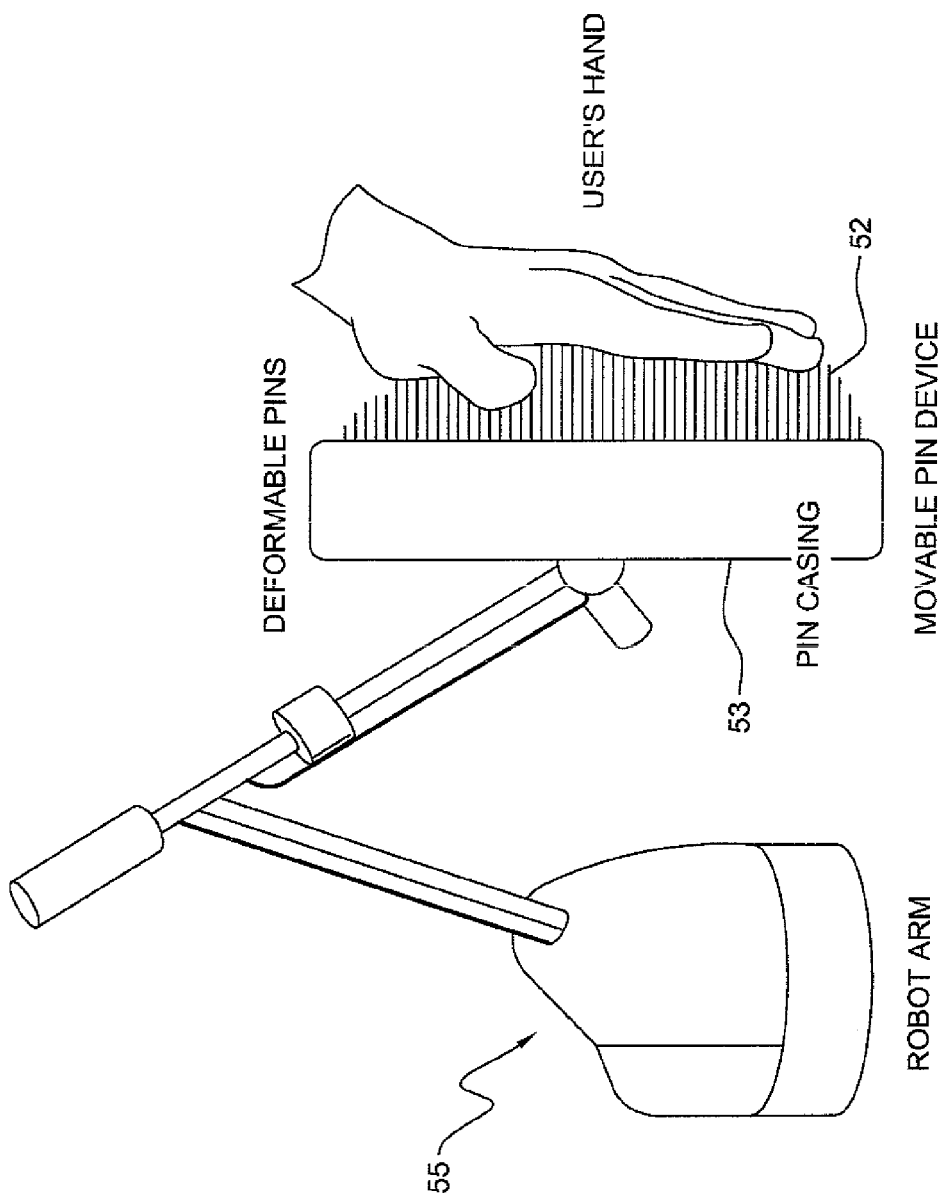
FIGS. 5a and 5b respectively illustrate, generally diagrammatically, in a detailed representation, a robotic device and an array of pins driven by an array of actuators utilized in implementing the inventive concept.
Figure 5B:
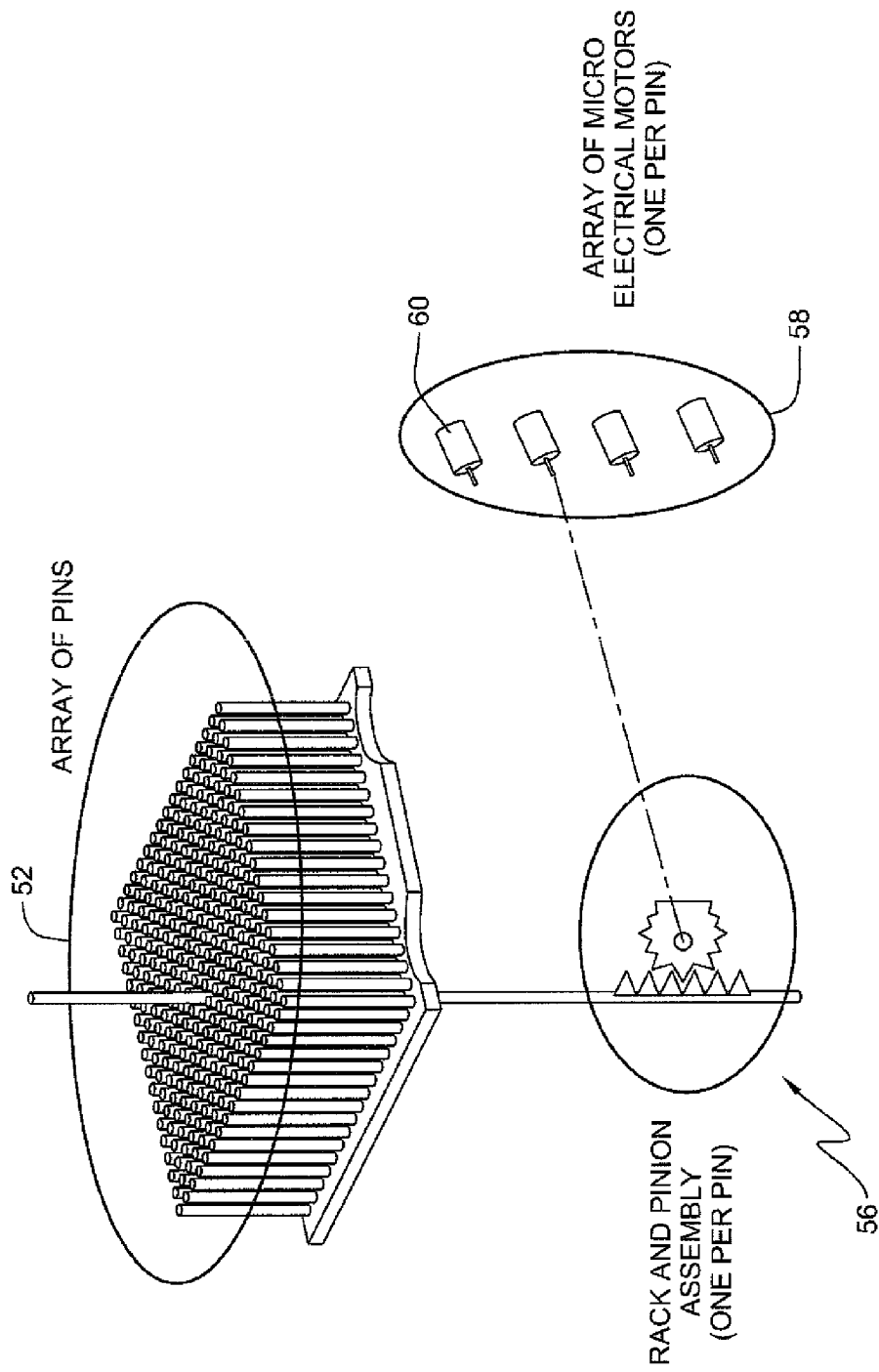

Finally, with regard to the implementation of structural details of a rack and pinion assembly 56, of which one is permitted for each pin, as shown in FIGS. 5*a* and 5*b*, the following may be implemented:

A controller for a virtual hand which is detailed and claimed in the co-pending U.S. patent application Ser. No. 12/047,848 is an array of pins 52 on a pin casing 53 attached to a robot arm 55, shown in FIG. 5*a*. The displacement of the pins represents the shape and texture of objects in the virtual world. The 6 degree-of-freedom robot arm may be based on previous art. FIG. 5*b* shows the manner pin displacement is controlled by an array of micro-electrical motors, one per pin, each driven by the rack and pinion assembly 56. The array of micro actuators 60 acts as an output device, communicating properties of the virtual world to the user through pin displacements. It also serves as an input device, allowing the user to edit and transform the virtual world model by pressing on the pins.

The array of pins 52 is driven by an array of actuators 58, small enough to accommodate such high resolution. This can be achieved by micro-motors 60 that drive the rack and pinion assembly. Such a mechanism allows for small actuators that can drive large vertical pin displacements. The vertical displacement should be matched to the size of the array, whereby the array size can be arbitrarily large, allowing it to be used for an extensive range of applications.

The control system 54 is a traditional feedback loop control that allows both measuring and varying the displacement of each pin. The description of such a component is readily available from the traditional Automatic Control literature and is not detailed herein. A computer program drives the height of each pin, and can also interpret the current height of pins when changed by an operator 62 so that they can be communicated to other pieces of software, such as a surface-modeling program. An important feature of the feedback loop control systems is the ability to change the apparent "stiffness" of each pin by changing the appropriate parameters of the control system. This feature allows the apparent stiffness of the surface to be changed to match specific requirements, such as modeling constraints, as described above.

3. A mechanism that enables the operator to move the device freely by translating it within a specific area of the plane on which it rests, and orienting it through three independent rotations, thereby imparting the ability to orient the device at any angle. The Robotic technical literature provides many examples of such mechanisms, and is described herein in detail.

4. A sensor 64 that detects the position and orientation of the device in space. This information is sent to the computer program that implements subsystem 2 (transformation 14) described above.

From the foregoing, it becomes readily apparent to one of skill in the art that the present invention clearly provides unique aspects over the current state-of-the-technology.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. A tactile input/output system for representing, manipulating and editing computer-generated surfaces, said system comprising:

at least one input device for providing a physical representation of a computer model on a computer display surface, said computer model comprises a mathematical model representing a surface reflecting a physical 3-D object;

a tactile device enabling a user to touch and modify said physical representation on the computer-generated surface, said tactile device including a 5 degree-of-freedom robot arm mounting an array of pins, said pins having tips matching the computer display surface;

a software controller of said computer enabling said robot arm mounting said array of pins to manipulate the computer model on the computer display surface, said array of pins mounted on said robot arm being displaceable by said software controller responsive to changes in the computer model representation to enable a user to edit and transform the computer model by pressing on the pins;

said robot arm mounting said array of pins being manipulatable by said user to facilitate viewing and manipulating of said computer model so as to change and enter new or modified shapes of said physical representation on said computer display surface responsive to operation by said user, while the computer controls and maintains the overall representation of the new or modified display surface and concurrently enforce any pre-established constraints by communicating properties of the physical 3-D object to the user through pin displacements.

2. A system as claimed in claim 1, wherein said computer model comprises a mathematical model representing surface reflecting a 2-D array drivable by specified parameters.

3. A system as claimed in claim 1, wherein said robot arm includes a 5 degree freedom of motion mechanism for operatively displaying said array of pins, said mechanism comprising a rack-and-pinion assembly for each pin of said array, wherein the heights of said pins are adjustable by a user to modify the computer display surface, and changes in the position of the pins in the tactile device are reflected in the computer model.

4. A system as claimed in claim 1, wherein said at least one input device includes transformation means for mathematically transforming a viewing angle on the computer surface, and the representation of said surface on the tactile device.

5. A system as claimed in claim 3, wherein said changes in the heights and positions of the pins facilitate modifying parameters of the computer model surface so as to determine surface deformations from a displacement of selected reference points on said surface.

6. A method of operating a tactile input/output system for representing and manipulating computer-generated 3-D surfaces, said method comprising:

providing, via a configured computer device, a physical representation of a computer model on a computer display surface, said computer model comprises a mathematical model representing a surface reflecting a physical 3-D object;

causing a tactile device to enable a user to touch and modify said physical representation on the display surface, said tactile device including a 5 degree-of-freedom robot arm mounting an array of pins, said pins having tips matching the computer display surface, said array of pins mounted on said robot arm being displaceable by a software controller responsive to changes in the computer model representation to enable a user to edit and transform the computer model by pressing on the pins; and manipulating, via said array of pins mounted on said robot arm, the computer model on the computer display surface to facilitate the viewing and manipulating said computer model so as to change and enter new or modified shapes of said physical representation on said computer display surface responsive to operation by said user, while the computer controls and maintains the overall representation of the new or modified display surface and concurrently enforce any pre-established constraints by communicating properties of the physical 3-D object to the user through pin displacements.

7. A method as claimed in claim 6, wherein said computer model provides for a mathematical model representing surface reflecting a 2-D array drivable by specified parameters.

8. A method as claimed in claim 6, wherein said robot arm includes a 5 degree freedom of motion mechanism for operatively displaying said array of pins, said mechanism comprising a rack-and-pinion assembly for each pin of said array, wherein the heights of said pins are adjustable by a user to modify the computer display surface and changes in the position of the pins in the tactile device are reflected in the computer model.

9. A method as claimed in claim 6, wherein said at least one input device has transformation means mathematically transforming a viewing angle on the computer surface, and the representation of said surface on the tactile device.

10. A method as claimed in claim 9, wherein said changes in the heights and positions of the pins modify parameters of the computer model surface so as to determine surface deformations from a displacement of selected reference points on said surface.

11. A tactile input/output device for representing and manipulating computer-generated 3-D surfaces, employable in operative relationship with at least one input device for providing a physical representation of a computer model on a computer display surface, wherein a software controller of said computer enables said tactile device to manipulate the computer model on the computer display surface; said tactile input/output device comprising:

a 5 degree-of-freedom robot arm mounting an array of pins having tops matching the computer display surface, said array of pins mounted on said robot arm being displaceable by said software controller responsive to changes in the computer model representation to enable a user to edit and transform the computer model, responsive to a user to touching and modifying said physical representation on the display surface, said array of pins mounted on said robot arm being manipulatable by said user to facilitate the yiewing and manipulating of said computer model so as to change and enter new or modified shapes of said physical representation on said computer display surface responsive to operation by said user, while the computer controls and maintains the overall representation of the new or modified display surface and concurrently enforce any pre-established constraints by communicating properties of a physical 3-D object to the user through pin displacements.

12. A device as claimed in claim 11, wherein said computer model comprises a mathematical model representing surface reflecting a real physical object, or a 2-D array drivable by specified parameters.

13. A device as claimed in claim 11, wherein said tactile device includes a 5 degree freedom of motion mechanism for operatively displaying said array of pins, said mechanism comprising a rack-and-pinion assembly for each pin of said array, wherein the heights of said pins are adjustable by a user to modify the computer display surface, and changes in the position of the pins in the tactile device are reflected in the computer model.

14. A device as claimed in claim 13, wherein said changes in the heights and positions of the pins facilitate modifying parameters of the computer model surface so as to determine surface deformations from a displacement of selected reference points on said surface.

* * * * *